United States Patent Office 3,071,519

Patented Jan. 1, 1963

3,071,519
METHOD FOR PRODUCING BIOLOGICAL PEST-DESTROYING REAGENTS

Antoine Bonnefoi, Bievres, France, assignor to Institut Pasteur, Paris, France, a French nationality No Drawing. Filed Mar. 18, 1960, Ser. No. 15,807
Claims priority, application France Mar. 20, 1959
7 Claims. (Cl. 195—96)

The present invention has for its object the production of substances adapted to biologically destroy caterpillars and further pests which produce havoc in cultures and forests, which substances are bestowed with a large selectivity.

Said substances are adapted to be used with any suitable dispersing means so as to be atomized as a liquid suspension or to be sprayed in a pulverulent condition on the plants to be protected together with the fillers required for ensuring a good dispersion; they are constituted chiefly by a mixture of spores and inclusion bodies produced during the sporulation of bacteria pathogenous for insects such as, in particular, *Bacillus thuringiensis* and similar species. The two components of said mixture act favorably on parasitic insects, the inclusion bodies acting through immediate toxaemia, while the spores act by leading to septicaemia.

Such insecticidal substances are obtained through the following operative stages, to wit: the development up to the formation of spores of a stock of bacteria having a pathogenous action on insects inside a liquid medium which is aerated or otherwise and, if possible, stirred, said medium containing aminated nitrogen and at least one sugar or glucide, with the possible incorporation of cations supplied by traces of mineral components, after which the spores and the inclusion bodies are collected when the culture is at an end through centrifugation or filtration, the substances obtained containing the spores and inclusion bodies thus collected being then dried and the insecticidal powder being formed by said drying, directly or after crushing and sifting. The method, the principle of which has been described, will now be disclosed with further details.

CULTURE

The cultures are obtained starting from the spores of a stock of bacteria such as, for instance, and chiefly, *Bacillus thuringiensis;* said bacillus is cultivated in a liquid, aerated medium, which may be stirred or otherwise; the medium contains aminated nitrogen, the contents by weight of nitrogen ranging between 0.6 and 1 part per 1,000 parts of the medium; said medium is obtained from one of the following supplies: meat or fish peptones, blood, casein, lacto-serum, hydrolysates of soja and peanut cakes, products obtained through the decoction of maize or corn, used singly or in admixture. Said medium contains furthermore 1 to 2% by weight of a glucide which, according to the bacterial stocks used, may be constituted by saccharose, glucose, maltose or dextrin. Lastly, said medium may contain traces of mineral elements such as calcium, zinc, manganese or magnesium. The bacilli are cultivated in deep vats. The culture medium is aerated and stirred, if required, while its temperature is maintained at 30° C. and its pH is held between 5.5 and 8.5. The culture continues until spores are released.

COLLECTING

The collecting of the desired material may be performed through one of the following methods:

On a high speed centrifuge of the Sharples type producing a semi-solid plug;

Through centrifugation in a skimmer of the Alfa-Laval type, which allows obtaining a concentrated slurry or suspension of spores and inclusion bodies;

Through filtration in a rotary filter in vacuo;

Through a layer of diatomaceous sand.

DRYING

The drying may be performed in any of the following manners:

By mixing the centrifugally obtained plug, as provided by a high speed centrifuge, with bentonitic clays. The product obtained, being thus finely sub-divided, is introduced into a rotary drier or an aerated kiln;

By heating directly said centrifuged plug inside a drying apparatus operating in vacuo and providing for the mechanical stirring of the mass to be heated;

By feeding through atomizing or otherwise the slurry obtained by centrifugation in a skimmer into a drier of the rotary drum type operating in vacuo or otherwise;

By atomization of such a slurry;

By drying in a rotary or pneumatic drier the moist powder obtained through filtration in vacuo.

CRUSHING AND SIFTING

The product obtained by drying a centrifuged plug or a moist filtered product is crushed and sifted by means of a sieve the fineness of which is at least equal to that of No. 180 sieve.

The products obtained in the shape of a slurry may be retained and packaged after drying, so as to serve subsequently as a suspension in water for atomization, or else, they may be treated by crushing and sifting as in the preceding case, with or without a filter.

The products obtained are standardized in conformity with the standards established by the French Laboratories de Lutte Biologique et de Biocinétique de La Minière (I.N.R.A.).

According to the procedure selected for collecting and drying, it is possible to operate for instance in accordance with one of the following techniques.

*First Example*

Starting from a culture of *Bacillus thuringiensis* in a liquid aerated medium, whether stirred or otherwise, the spores and inclusion bodies are subjected to centrifugation in a high speed continuously operating centrifuge of the Sharples type. The semi-solid plug obtained is then mixed with a bentonitic clay such as the bentonite sold under the registered trade name Clarsol F.B. 2 and it is dried in a semi-thin layer inside an aerated kiln, or else, in a vertical rotary drier through a counter-current of dry air at a temperature of about 40° C. The product obtained is finally crushed in a hammer or roller crusher and is sifted through a sieve No. 180 or of a finer mesh structure.

*Second Example*

The *Bacillus thuringiensis* is cultivated in an aerated liquid medium, stirred or otherwise.

The spores and inclusion bodies are collected through filtration in a rotary filter in vacuo over a layer of diatomite, the upper layer of diatomite containing the spores and inclusion bodies being continuously removed.

The drying, crushing and sifting are performed as in the case of the first example.

*Third Example*

The *Bacillus thuringiensis* is cultivated in an aerated liquid medium, whether stirred or otherwise; the spores and inclusion bodies are collected by centrifugation in a skimmer of the Alfa-Laval type.

The centrifuged milk-like liquid obtained is dried on a rotary drum in vacuo or otherwise, or through atomization.

The powders thus obtained may serve as a liquid suspension or be admixed with a pulverulent filler.

Fourth Example

The culture is treated on a high speed centrifuge of the Sharples type. The plug obtained is dried in a drier operating in vacuo and allowing a mechanical stirring of the mass to be dried if required, or else, the plug may be dried, after incorporation of a gas, inside a furnace provided with a plate heating in vacuo.

Fifth Example

A small amount of water may be incorporated with the centrifuged plug and the milk-like liquid obtained is treated as described in the third example.

Obviously, many modifications, detail improvements and substitution of equivalent means for the means disclosed may be imagined without unduly widening thereby the scope of the invention as defined in the accompanying claims.

It will also be ascertained that, although the method according to the invention resorts chiefly to cultures of sporulating bacilli producing inclusion bodies, of which bacilli the type is *Bacillus thuringiensis*, it is possible to a series of other bacilli, of which a few may be mentioned in accordance with the classification by Heimpel and Angus (Can. J. Microbiol. 1958, 4,531–541: *B. sotto, B. thuringiensis*, var. *alesti, B. entomocidus* var. *subtoxicus, B. finitimus*). This list is by no means to be considered as exhaustive.

The inclusion bodies are released at the end of the cultivation in the form of a shaped element, together with the spores. Thus, it is possible to collect through a single operation such as a high speed centrifugation, or a filtration through a filler, the inclusion bodies which is the specific agent for toxaemia and the spores which produce septicaemia. It will be noted that the media used for the growth of such bacteria may vary within comparatively broad limits as concerns the supply of products serving for their formation, their grade depending on a complex equilibrium of aminated acids.

The temperature to be used for the execution of the invention is about 30° C.; while this temperature is not necessarily the optimum temperature for all the stocks of interest, it corresponds to an active production of inclusion bodies.

What I claim is:

1. Method of culturing *Bacillus thuringiensis*, said method comprising culturing a stock of *Bacillus thuringiensis* in a liquid medium containing animated nitrogen and at least one glucide and also containing as trace element at least one metal selected from the group consisting of calcium, zinc, manganese and magnesium until sporulation of said stock; and separating the resulting solid material from the liquid medium, thereby obtaining the spores and inclusion bodies of said *Bacillus thuringiensis*.

2. Method of culturing *Bacillus thuringiensis*, said method comprising culturing a stock of *Bacillus thuringiensis* in a liquid medium containing animated nitrogen and at least one glucide and also containing as trace element at least one metal selected from the group consisting of calcium, zinc, manganese and magnesium until sporulation of said stock; and subjecting the thus-formed mixture to high-speed centrifugation so as to separate the resulting solid material from the liquid medium, thereby obtaining the spores and inclusion bodies of said *Bacillus thuringiensis*.

3. Method of culturing *Bacillus thuringiensis*, said method comprising culturing a stock of *Bacillus thuringiensis* in a liquid medium containing animated nitrogen and at least one glucide and also containing as trace element at least one metal selected from the group consisting of calcium, zinc, manganese and magnesium until sporulation of said stock; separating the resulting solid material from the liquid medium, thereby obtaining the spores and inclusion bodies of said *Bacillus thuringiensis*; and uniformly mixing the thus-obtained solid material with bentonite so as to dry said material and form a homogeneous, easily dispersible product.

4. Method of culturing *Bacillus thuringiensis*, said method comprising culturing a stock of *Bacillus thuringiensis* in a liquid medium containing aminated nitrogen and at least one glucide and also containing as trace element at least one metal selected from the group consisting of calcium, zinc, manganese and magnesium until sporulation of said stock; subjecting the thus-formed mixture to high-speed centrifugation so as to separate the resulting solid material from the liquid medium, thereby obtaining the spores and inclusion bodies of said *Bacillus thuringiensis*; and uniformly mixing the thus-obtained solid material with bentonite so as to dry said material and form a homogeneous, easily dispersible product.

5. Method of culturing *Bacillus thuringiensis*, said method comprising culturing a stock of *Bacillus thuringiensis* in a liquid medium containing aminated nitrogen in an amount of between about 0.6 and 1 part of said aminated nitrogen per each 1,000 parts of said medium and at least one glucide and also containing as trace element at least one metal selected from the group consisting of calcium, zinc, manganese and magnesium until sporulation of said stock; and separating the resulting solid material from the liquid medium, thereby obtaining the spores and inclusion bodies of said *Bacillus thuringiensis*.

6. Method of culturing *Bacillus thuringiensis*, said method comprising culturing a stock of *Bacillus thuringiensis* in a liquid medium containing aminated nitrogen in an amount of between about 0.6 and 1 part of said aminated nitrogen per each 1,000 parts of said medium and at least one glucide in an amount of between about 1% and 2% by weight and also containing as trace element at least one metal selected from the group consisting of calcium, zinc, manganese and magnesium until sporulation of said stock; and separating the resulting solid material from the liquid medium, thereby obtaining the spores and inclusion bodies of said *Bacillus thuringiensis*.

7. Method of culturing *Bacillus thuringiensis*, said method comprising culturing at a temperature of about 30° C. a stock of *Bacillus thuringiensis* in a liquid medium at a pH between about 5.5 and 8.5 containing aminated nitrogen in an amount of between about 0.6 and 1 part of said aminated nitrogen per each 1,000 parts of said medium and at least one glucide in an amount of between about 1% and 2% by weight and also containing as trace element at least one metal selected from the group consisting of calcium, zinc, manganese and magnesium until sporulation of said stock; and separating the resulting solid material from the liquid medium, thereby obtaining the spores and inclusion bodies of said *Bacillus thuringiensis*.

References Cited in the file of this patent

UNITED STATES PATENTS 2,844,515    Sobotka et al. _____ July 22, 1958

OTHER REFERENCES

Chemical and Engineering News, 36: 51, December 22, 1958, page 15.

Fleschner: Science, vol. 129, Number 3348, February 27, 1959, pages 537–544.

Kushner et al.: J. Gen. Microbiology 21, 1959, page 96.